US010950006B2

(12) United States Patent
McLean

(10) Patent No.: US 10,950,006 B2
(45) Date of Patent: Mar. 16, 2021

(54) ENVIRONMENTALLY CONTEXTUALIZED PATTERN GENERATION

(71) Applicant: Katherine A. McLean, Pittsburgh, PA (US)

(72) Inventor: Katherine A. McLean, Pittsburgh, PA (US)

(73) Assignee: Katherine A. McLean, Pittsburgh, PA (US)

(*) Notice: Subject to any disclaimer, the term of this patent is extended or adjusted under 35 U.S.C. 154(b) by 164 days.

(21) Appl. No.: 15/980,222

(22) Filed: May 15, 2018

(65) Prior Publication Data
US 2018/0336706 A1 Nov. 22, 2018

Related U.S. Application Data
(60) Provisional application No. 62/507,485, filed on May 17, 2017.

(51) Int. Cl.
G06T 7/90 (2017.01)
G06T 5/00 (2006.01)
G06T 11/00 (2006.01)
G06T 5/50 (2006.01)

(52) U.S. Cl.
CPC ............. G06T 7/90 (2017.01); G06T 5/009 (2013.01); G06T 5/50 (2013.01); G06T 11/001 (2013.01); G06T 2207/30184 (2013.01)

(58) Field of Classification Search
CPC .... G06T 7/90; G06T 7/97; G06T 7/85; G06T 5/007; G06T 5/008; G06T 5/009; G06T 5/50; G06T 11/001; G06T 2207/30184; G06T 19/20; G06T 2219/2012
USPC ........................................ 382/162–168, 172
See application file for complete search history.

(56) References Cited

U.S. PATENT DOCUMENTS

| 4,477,833 A * | 10/1984 | Clark | H04N 1/6025 358/524 |
| 4,481,532 A * | 11/1984 | Clark | H04N 1/6033 358/504 |
| 5,588,050 A * | 12/1996 | Kagawa | H04N 1/60 348/E9.047 |
| 7,755,817 B2 * | 7/2010 | Ho | H04N 1/6058 358/1.9 |

* cited by examiner

Primary Examiner — Nirav G Patel
Assistant Examiner — Stephen M Brinich
(74) Attorney, Agent, or Firm — K&L Gates LLP

(57) ABSTRACT

Various systems and methods for generating environmentally contextualized patterns are disclosed. The system and method generates the environmentally contextualized pattern from a set of images representing an environment. The color palette of the dominant colors from the representational images is processed to remove the gray hues, set the remaining highest and lowest value hues to a particular contrast, and then determine a split complement from the lowest value hue. An algorithm, such as a reaction-diffusion algorithm, is then utilized to generate a pattern incorporating the aforementioned hues. The pattern generated by the algorithm provides a high degree of visual contrast with the environment that the images represent, allowing an individual wearing the pattern to be readily visually identifiable against the environment.

17 Claims, 8 Drawing Sheets

ENVIRONMENTALLY CONTEXTUALIZED PATTERN GENERATION

PRIORITY

This application claims the benefit of priority under 35 U.S.C. § 119(e) to U.S. Provisional Patent Application No. 62/507,485, titled PROTECTION THROUGH IDENTITY-IMPROVING CYCLING THROUGH DESIGN INFORMED BY BIOMIMICRY, COGNITION, AND PERCEPTION, filed May 17, 2017, the disclosure of which is hereby incorporated by reference in its entirety.

BACKGROUND

The future success of American cities depends on the support and improvement of the urban cycling experience. Although cycle-commuting is healthy, sustainable, and fun, cycling in the city is dangerous and stressful, to a degree that limits the number of people willing to adopt the practice. Especially in older cities where archaic infrastructure and narrow streets compound the communication issues between drivers and cyclists, being a cyclist requires a certain level of confidence and risk-taking that many people cannot afford. Improving the safety of this practice through better communication and heightened visibility would increase the quality of the experience and the number of participants. Urban cyclists' safety can be improved by translating the visual communication strategies exhibited by other organisms into human-specific solutions. In this way, highly dynamic reaction-diffusion patterns that are specifically generated for the environment in which the pattern is intended to be utilized can dramatically increase the visibility of cyclists. Further, these environmentally contextualized patterns can be expanded into other contexts, such as for equipment for construction workers and other apparel or equipment where it is critical to the safety and well-being of the wearer to be readily visually identifiable against the environment in which the wearer is present.

SUMMARY

In one general aspect, the present disclosure is directed to a computer-implemented method for generating an environmentally contextual pattern from a color palette representing an environment. The method includes removing each gray hue from the color palette to generate a modified color palette, setting a highest lightness value hue of the modified color palette and a lowest lightness value hue of the modified color palette to a predetermined contrast to generate a modified highest lightness value hue and a modified lowest lightness value hue, determining a split complement hue of the modified lowest lightness value hue, and generating a pattern including the split complement hue of the modified lowest lightness value hue occupying x % of the pattern, the modified highest lightness value hue occupying y % of the pattern, and the modified lowest lightness value hue occupying z % of the pattern, wherein x>y>z.

In another general aspect, the present disclosure is directed to a computer-implemented method for generating an environmentally contextualized pattern. The method includes receiving images of an environment, generating a color palette of dominant colors from the images, removing each gray hue from the color palette to generate a modified color palette, setting a highest lightness value hue of the modified color palette and a lowest lightness value hue of the modified color palette to a predetermined contrast to generate a modified highest lightness value hue and a modified lowest lightness value hue, determining a split complement hue of the modified lowest lightness value hue, and generating a pattern including the split complement hue of the modified lowest lightness value hue, the modified highest lightness value hue, and the modified lowest lightness value hue, wherein the split complement hue of the modified lowest lightness value hue occupies more of a surface area of the pattern than the modified highest lightness value hue and the modified highest lightness value hue occupies more of the surface area of the pattern than the modified lowest lightness value hue.

In yet another general aspect, the present disclosure is directed to a computer system for generating an environmentally contextualized pattern from a color palette representing an environment. The computer system includes a processor and a memory coupled to the processor. The memory stores instructions that, when executed by the processor, cause the computer system to remove each gray hue from the color palette to generate a modified color palette, set a highest lightness value hue of the modified color palette and a lowest lightness value hue of the modified color palette to a predetermined contrast to generate a modified highest lightness value hue and a modified lowest lightness value hue, determine a split complement hue of the modified lowest lightness value hue, and generate a pattern including the split complement hue of the modified lowest lightness value hue occupying x % of the pattern, the modified highest lightness value hue occupying y % of the pattern, and the modified lowest lightness value hue occupying z % of the pattern, wherein x>y>z.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

DESCRIPTION

Before explaining various aspects of the systems and methods of generating environmentally contextualized patterns in detail, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

The present disclosure is directed generally to systems and methods for generating environmentally contextualized patterns, i.e., patterns that are unique to a particular environment. Environmentally contextualized patterns can have a wide range of applications, including for cycling apparel or other types of equipment where it would benefit the wearer to stand out against the environment in which he or she is present.

Figure 1:
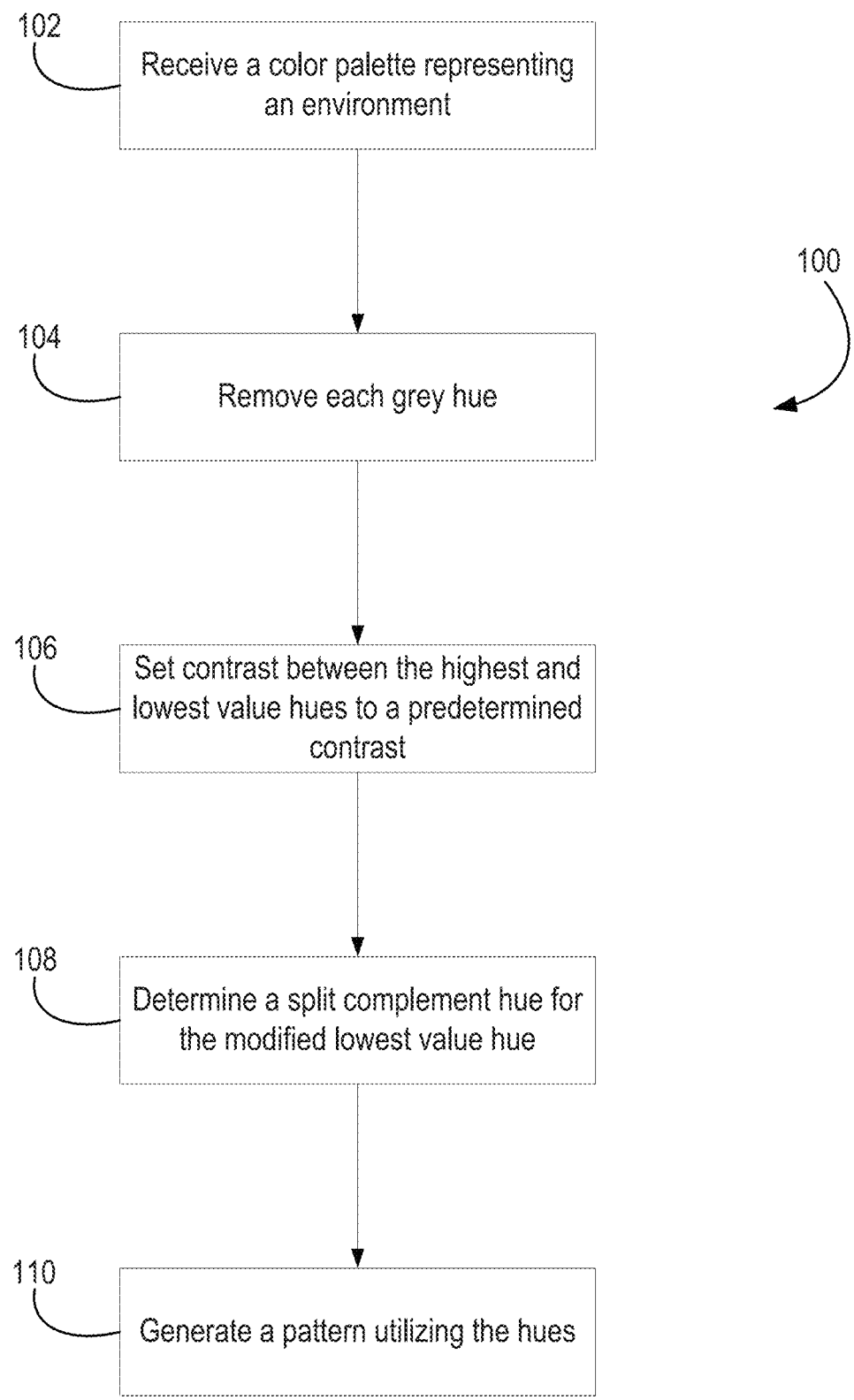
FIG. 1 illustrates a logic flow diagram of a process for generating an environmentally contextualized pattern, in accordance with at least one aspect of the present disclosure.
Figure 2:
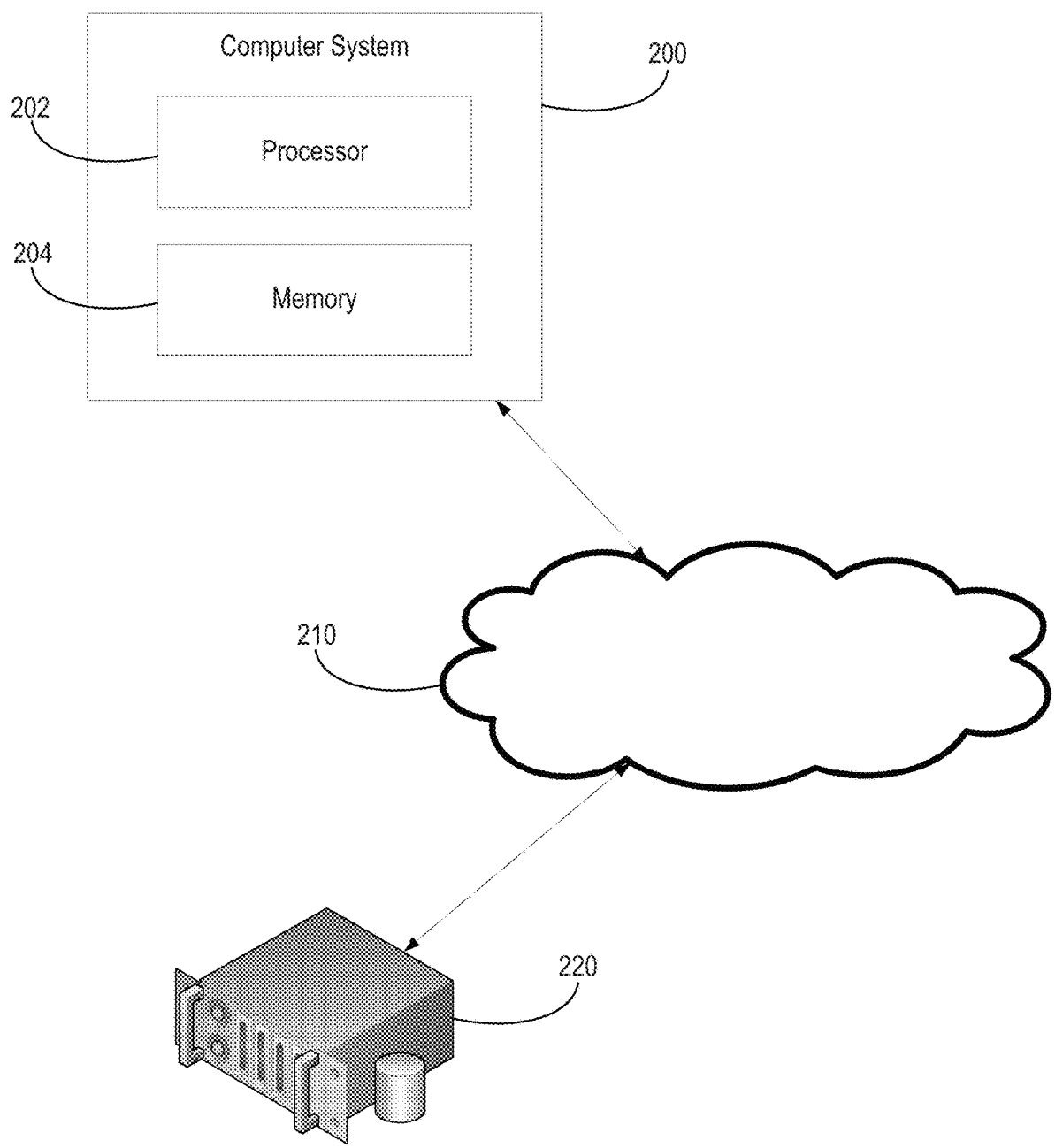
FIG. 2 illustrates a diagram of a system for generating an environmentally contextualized pattern, in accordance with at least one aspect of the present disclosure.

FIG. 1 illustrates a logic flow diagram of a process 100 for generating an environmentally contextualized pattern, in accordance with at least one aspect of the present disclosure. In the following description of the process 100, reference should also be made to FIGS. 2-3D. In one exemplification, the process 100 can be carried out by a processor 202 executing instructions stored in a memory 204 of a computer system 200. Accordingly, the processor 202 executing the process 100 receives 102 a color palette representing an environment, such as the color palette 300 represented in FIG. 3A. For representational purposes, the illustrative color palette 300 is arranged along a scale 302 representing the relative lightness (i.e., value or tone) of the hues making up the color palette 300. The scale 302 is arranged such that a hue having a value of ten would appear to be completely black and a hue having a value of one would appear to be nearly white. The scale 302 can represent a linear grayscale, for example, where a value of ten is equal to 100% black and a value of one is equal to 10% black. In other words, higher value hues appear darker and lower value hues appear lighter. The following description of the process 100 will make reference to an illustrative color palette 300 that includes a first hue 304, a second hue 306, a third hue 308, a fourth hue 310, and a fifth hue 312; however, it should be noted that the depicted color palette 300 is merely provided to illustrate the concepts discussed herein and that there are no limitations on the number or arrangement of the hues making up the color palette 300 received 102 by the processor 202. The received 102 color palette can be, for example, retrieved from the memory 204 of the computer system 200, received from an external computer system (e.g., a server database 220) that is communicably connected to the computer system 200 (e.g., via the Internet 210), or generated by the computer system 200 or another computer system, as discussed below with respect to FIG. 5.

Figure 3A:
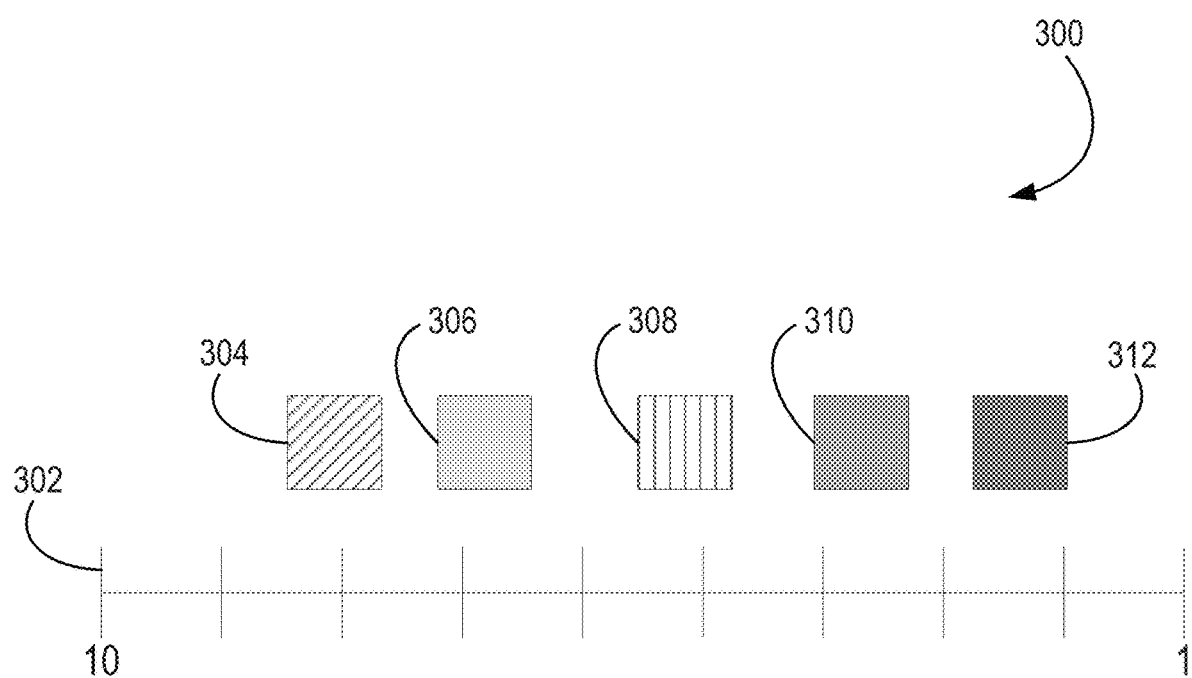
FIG. 3A illustrates a diagram of a color palette representing an environment, in accordance with at least one aspect of the present disclosure.
Figure 3B:
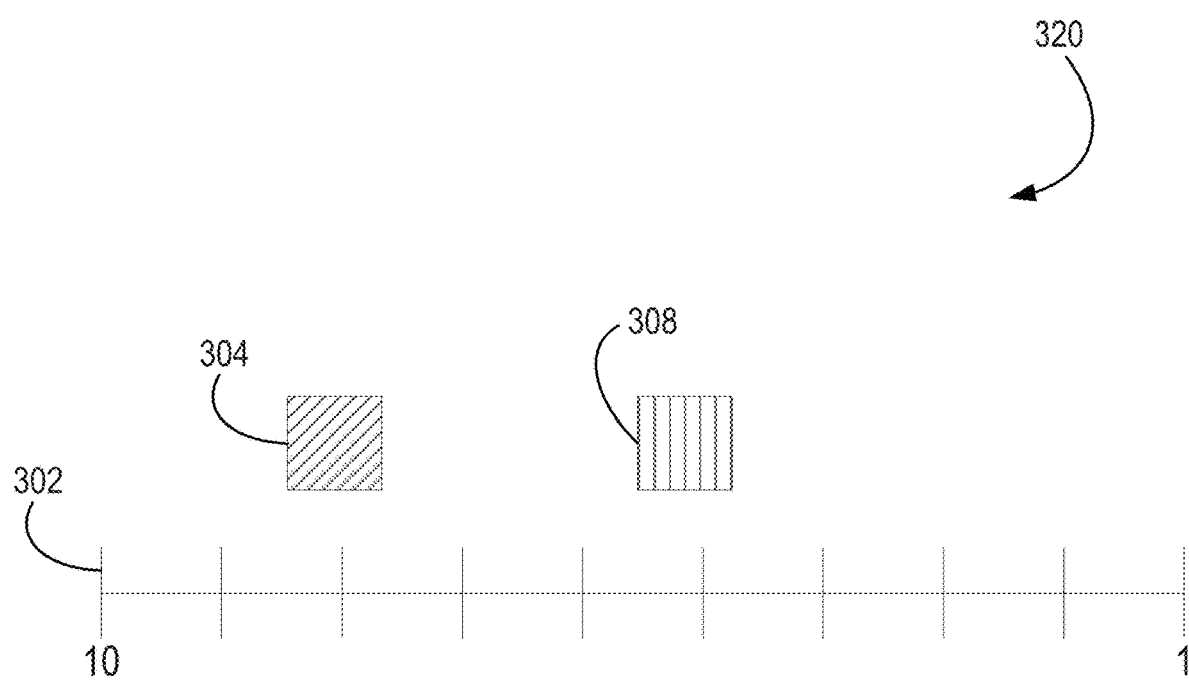
FIG. 3B illustrates a diagram of the color palette from FIG. 3A with the gray hues removed, in accordance with at least one aspect of the present disclosure.

After receiving 102 the color palette 300, the processor 202 removes 104 each of the gray hues from the color palette 300. This generates a modified color palette 320 containing the remaining hues. In FIG. 3A, the second hue 306, fourth hue 310, and the fifth hue 312 are gray hues and are thus removed 104 by the processor 202. The resulting modified color palette 320 containing the first hue 304 and the third hue 308 is depicted in FIG. 3B. It should be noted that the number of gray hues present within the received 102 color palette 300 can vary according to the particular environment represented by the color palette 300 and the number of hues making up the color palette 300. The gray hues are removed from the environmental color palette 300 because any saturated color contrasts with gray hues; therefore, the gray hues are not useful for creating an environmentally contextualized pattern that is unique to each given environment.

Figure 3C:
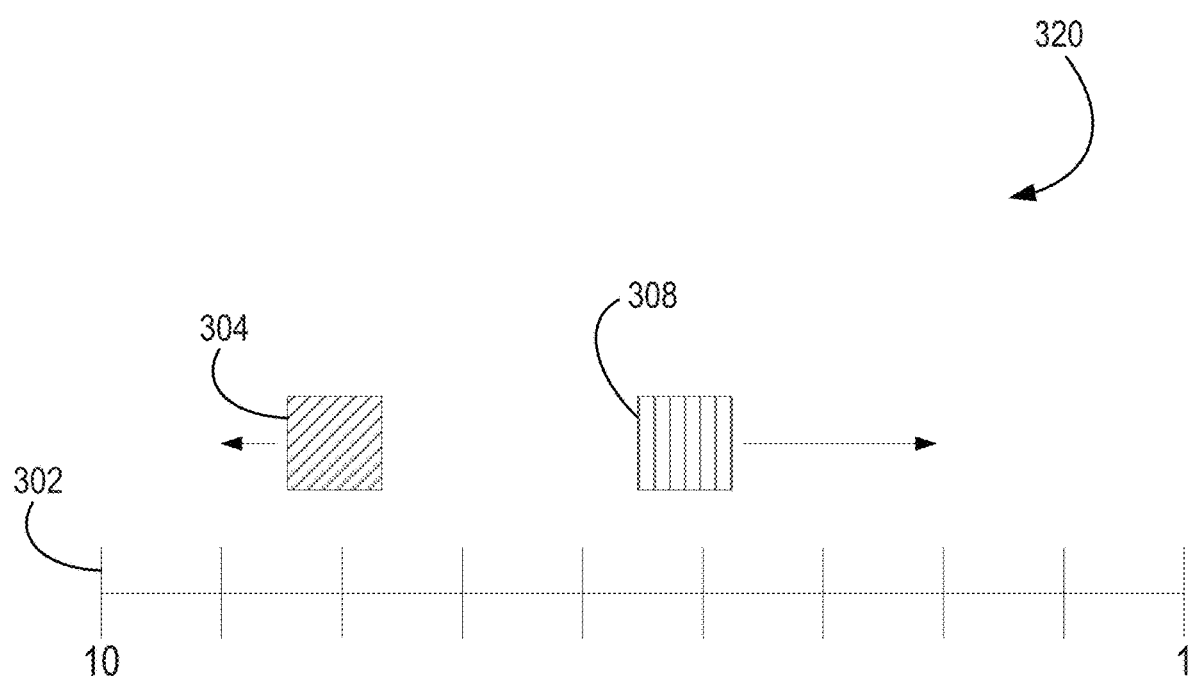
FIG. 3C illustrates a diagram of the color palette from FIG. 3B with the contrast between the highest and lowest value hues being increased, in accordance with at least one aspect of the present disclosure.
Figure 3D:
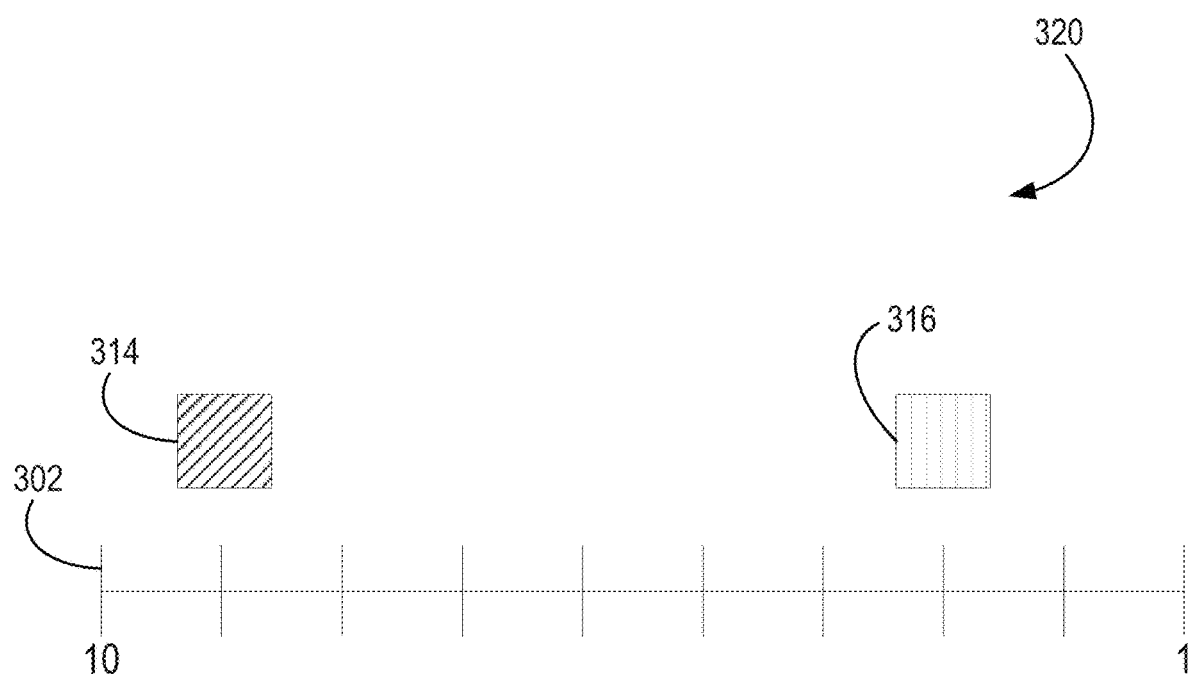
FIG. 3D illustrates a diagram of the resulting color palette from FIG. 3C, in accordance with at least one aspect of the present disclosure.

Once the gray hues are removed from the original color palette 300, the processor 202 sets 106 the contrast between the remaining hue having the highest lightness value (i.e., the darkest hue) and the remaining hue having the lowest lightness value (i.e., the lightest hue) to a predetermined contrast. In the example depicted in FIG. 3B, the first hue 304 has the highest lightness value among the remaining hues and the third hue 308 has the lowest lightness value. The predetermined contrast can be a predetermined difference between the values of the remaining highest and lowest value hues or predetermined values to which the remaining highest and lowest value hues are set. In one exemplification, the remaining highest value hue is set a lightness value of nine and the remaining lowest value hue is a set to a lightness value of three, as depicted in FIG. 3C. The resulting modified color palette 320 thus includes a modified highest value hue 314 and a modified lowest value hue 316 from the original color palette 300 received 102 by the processor 202. The contrast between the highest and lowest value hues of the modified color palette 320 is set to a specific level in order to ensure that there is a requisite level of contrast between the hues so that the pattern generated from the hues is readily visually identifiable against the environmental backdrop for which the pattern was generated.

The processor 202 then determines 108 a split complement hue from the modified lowest value hue 316 (i.e., the lightest hue as modified after the contrast is set 106) from the modified color palette 320. A split complement hue is a hue that is adjacent to the direct complement of a selected hue on the color wheel; therefore, each selected hue has two split complements. In one aspect, the instructions executed by the processor 202 cause the processor 202 to select one of the two split complements of the modified lowest value hue 316 according to a preprogrammed constraint (e.g., by always selecting the split complement that is farthest from the modified highest value hue 314 on the color wheel) or at random. In another aspect, the processor 202 provides a prompt for the user to select which split complement to utilize. In yet another aspect, the processor 202 generates two separate patterns, wherein one pattern utilizes a first split complement and another pattern utilizes a second split complement. In one exemplification, the split complement hue is generated from the lowest value hue to maintain the necessary contrast ratio between the lowest and highest value hues of the modified color palette 320. In one exemplification, the split complement is set to a lightness value that is higher than the lightness value of the modified lowest value hue 316 from which the split complement is generated. For example, in aspects where the modified lowest value hue 316 is set to a lightness value of three, the split complement can be set to a lightness value of seven. In an alternative exemplification, the processor 202 instead determines a split complement hue from the modified highest value hue 314 from the modified color palette 320. A split complement of the modified environmental hues is selected because split complements offer the same degree of visual contrast as a direct complement but cause less tension. While color tension can be important in generating a pattern that is readily visually identifiable against the environment, too much color tension can create a pattern that is overly distracting for drivers. Additionally, pairing direct complements is often too harsh to be seen as attractive in a fashion sense.

Figure 4:
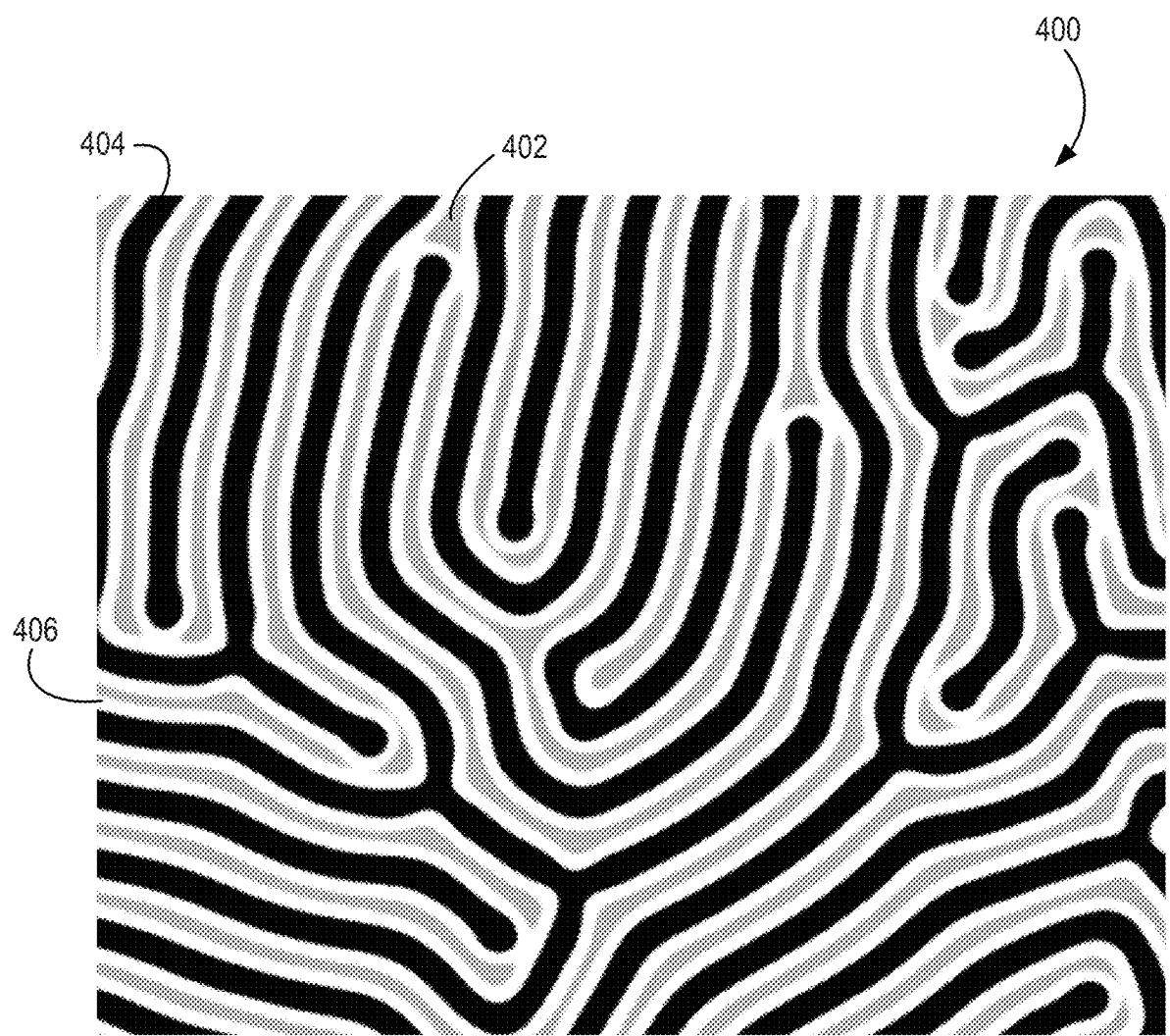
FIG. 4 illustrates an environmentally contextualized pattern, in accordance with at least one aspect of the present disclosure.

The processor 202 then generates 110 a pattern utilizing the modified highest value hue 314, the modified lowest value hue 316, and the determined 108 split complement of the lowest value hue 316. The processor 202 can generate 110 the pattern by utilizing, for example, a predetermined algorithm or an algorithm selected by a user. In one aspect, the pattern-generation algorithm can be selected to generate a sizeable perimeter bounding each of the areas occupied by the different hues, which in turn creates a high degree of visual contrast between the three hues and allows the generated 110 pattern to stand out against the environment represented by the original color palette 300. In one aspect, the processor 202 generates 110 the pattern via a reaction-diffusion algorithm, such as the Gray-Scott model for reaction-diffusion systems. Further, in various aspects of the process 100, the generated 110 pattern can include the modified highest value hue 314, the modified lowest value hue 316, and the determined 108 split complement of the lowest value hue 316 in a set ratio with respect to each other. In one exemplification, the split complement hue of the modified lowest lightness value hue occupies x % of the pattern, the modified highest lightness value hue occupies y % of the pattern, and the modified lowest value lightness hue occupies z % of the pattern, wherein x>y>z. The percentage of the generated 110 pattern occupied by the various hues can include the percentage of the surface area of the pattern. FIG. 4 depicts an illustrative pattern 400 generated by a reaction-diffusion algorithm according to the process 100, wherein the split complement 402 of the modified lowest lightness value hue 406 occupies a larger portion of the pattern 400 than the modified highest lightness value hue 404, which in turn occupies a larger portion of the pattern 400 than the modified lowest lightness value hue 406. In one exemplification, the pattern 400 is generated so that the modified lowest lightness value hue 406 is situated between the split complement 402 and the modified highest lightness value hue 406, which creates a strong value contrast along all shape edges present in the pattern 400 and builds an effective simultaneous contrast by juxtaposing the modified lowest lightness value hue 406 and the split complement 402 generated therefrom. Further, the selected color triad for the pattern 400 mimics color strategies found in nature to stand out against the environment.

Figure 5:
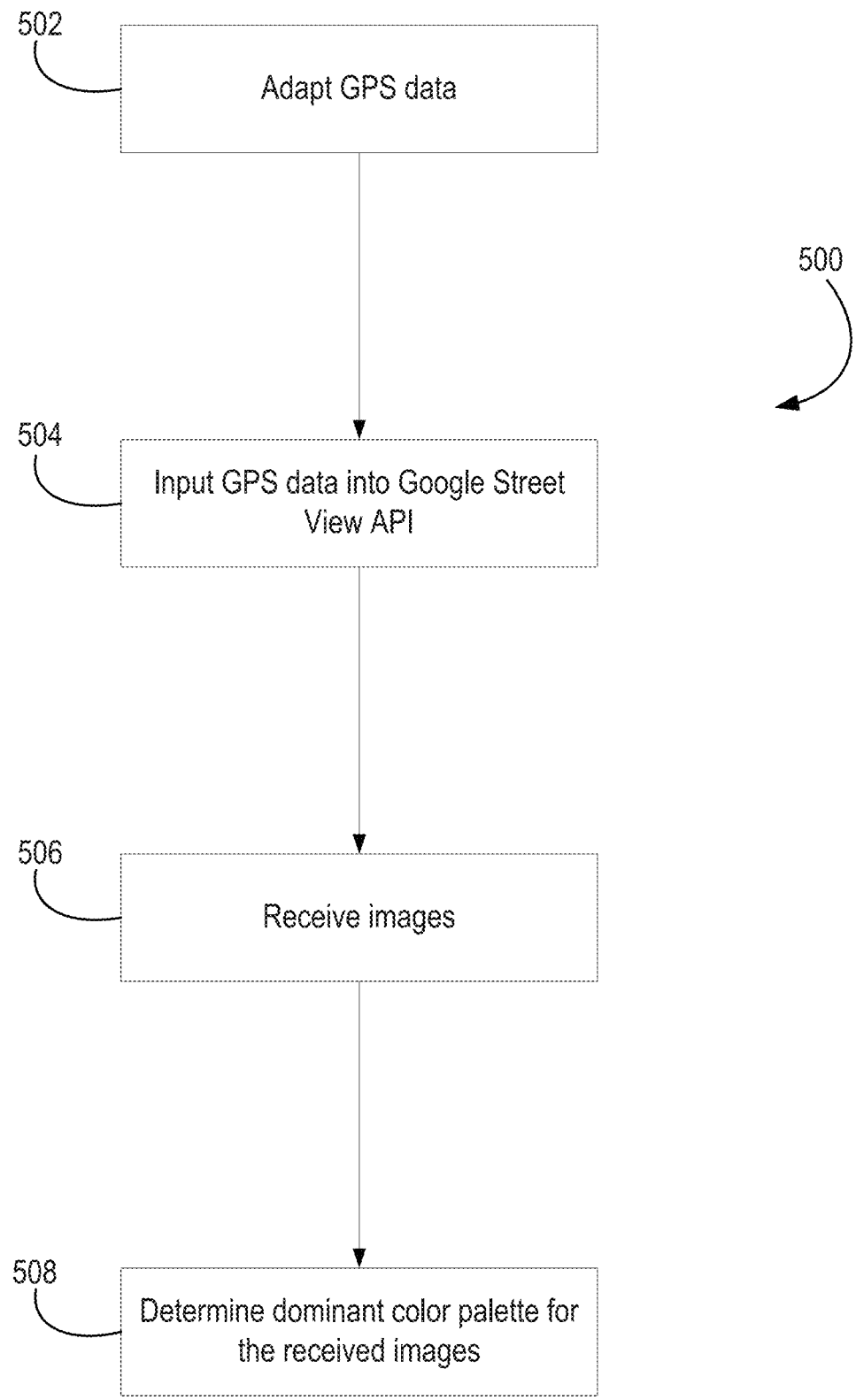
FIG. 5 illustrates a logic flow diagram of a process for generating a color palette representing an environment, in accordance with at least one aspect of the present disclosure.

As discussed above, the environmental color palette received 102 by the processor 202 executing the process 100 can be generated in a number of different ways. In one aspect, the environmental color palette can be generated from GPS data provided by a user. Such GPS data could represent, for example, the user's daily work commute or the environment in which the user works (e.g., a highway under construction for a construction worker). The GPS data could be utilized to generate a pattern that would allow the user to stand out against the environment when worn, making the wearer safer by allowing motorists to more easily perceive the wearer. For example, FIG. 5 illustrates a logic flow diagram of a process 500 for generating a color palette representing an environment, in accordance with at least one aspect of the present disclosure. In the following description of the process 500, reference should also be made to FIG. 2. In one exemplification, the process 500 can be carried out by a processor 202 executing instructions stored in a memory 204 of a computer system 200. In another exemplification, the process 500 can be carried out by a secondary or external computer system and the resulting color palette generated by the process 500 can be communicated to or otherwise received by the computer system 200 executing the process 100. In the interests of economy, the process 500 will be described as being executed by the processor 202 of the computer system 200, but it should be noted that this is only one aspect encompassed by this disclosure.

Accordingly, the processor 202 executing the process 500 adapts 502 the GPS data into a format suitable to be input 504 into the Google Street View Image API. Adapting 502 the GPS data can include, for example, converting the GPS data into a format suitable to retrieve image data via the Google Street View Image API. Adapting 502 the GPS data can also include, for example, smoothing or straightening the path defined by the GPS data so that the images retrieved via the Google Street View Image API face in the general direction of the path, as opposed to the direction of each individual GPS data point. Adapting 502 the GPS data in this manner can be beneficial in contexts where the generated pattern is intended to be utilized for creating cycling apparel, for example, so that the pattern is generated from a set of images representing the environment against which motorists will be viewing the cyclist, as opposed to a set of images representing an adjacent environment.

After the GPS data is input 504 into the Google Street View Image API, the processor 202 correspondingly receives 506 a set of images representing the environment defined by the GPS data. In one exemplification, only a subset of the GPS data points is input into the Google Street View Image API in order to reduce the number of images received 506 therefrom. The processor 202 then determines 508 a color palette of the dominant colors in the received 506 images. In one exemplification, the processor 202 determines 508 the dominant color palette utilizing a k-means clustering algorithm that is configured to analyze the images pixel-by-pixel and determine the best way to partition the RGB data into a predetermined number of clusters (e.g., five clusters). The k-means clustering can thus output a series of color clusters whose sizes represent the percentages of each color cluster in the received 506 images. The clustering algorithm can, for example, minimize the noise created by minute variations in hues in order to provide a comprehensive selection of hues representing the environment defined by the GPS data.

Referring back to FIG. 1, the pattern generated 110 by the process 100 can be utilized in a number of different applications. In one aspect, the processor 202 executing the process 100 further applies the generated 110 pattern to a material (e.g., a textile) or an article of clothing (e.g., a T-shirt, a backpack, or cycling apparel, such as a cycling jersey). The processor 202 can apply the generated 110 pattern to a material or an article of clothing via, for example, screen-printing or another such technique.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical, or other forms of propagated signals (e.g., carrier waves, infrared signals, digital signals, etc.). Accordingly, the nontransitory computer-readable medium includes any type of tangible machine-readable medium suitable for storing or transmitting electronic instructions or information in a form readable by a machine (e.g., a computer).

As used in any aspect herein, the term "logic" may refer to an app, software, firmware, and/or circuitry configured to perform any of the aforementioned operations. Software may be embodied as a software package, code, instructions, instruction sets, and/or data recorded on nontransitory computer readable storage medium. Firmware may be embodied as code, instructions or instruction sets, and/or data that are hard-coded (e.g., nonvolatile) in memory devices.

As used in any aspect herein, an "algorithm" refers to a self-consistent sequence of steps leading to a desired result, where a "step" refers to a manipulation of physical quantities and/or logic states that may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

Any patent application, patent, nonpatent publication, or other disclosure material referred to in this specification and/or listed in any Application Data Sheet is incorporated by reference herein, to the extent that the incorporated materials are not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described, which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A computer-implemented method for generating an environmentally contextual pattern from a color palette representing an environment, the method comprising:
   removing each gray hue from the color palette representing the environment to generate a modified color palette;
   setting a highest lightness value hue of the modified color palette and a lowest lightness value hue of the modified color palette to a predetermined contrast to generate a modified highest lightness value hue and a modified lowest lightness value hue;
   determining a split complement hue of the modified lowest lightness value hue;
   generating the environmentally contextual pattern, wherein the generated environmentally contextual pattern comprises the split complement hue of the modified lowest lightness value hue occupying x % of the environmentally contextual pattern, the modified highest lightness value hue occupying y % of the environmentally contextual pattern, and the modified lowest lightness value hue occupying z % of the environmentally contextual pattern, wherein $x>y>z$; and
   applying the environmentally contextual pattern to at least one of the following:
      an article of clothing to improve visibility of a wearer of the article of clothing within the environment; and
      a piece of equipment to improve visibility of the piece of equipment within the environment.

2. The computer-implemented method of claim 1, wherein generating the environmentally contextual pattern comprises utilizing a reaction-diffusion algorithm.

3. The computer-implemented method of claim 2, wherein the reaction-diffusion algorithm comprises a Gray-Scott algorithm.

4. The computer-implemented method of claim 1, wherein setting the highest lightness value hue of the modified color palette and the lowest lightness value hue of the modified color palette to a predetermined contrast comprises:
   setting the highest lightness value hue of the modified color palette to a first predetermined lightness value; and
   setting the lowest lightness value hue of the modified color palette to a second predetermined lightness value.

5. The computer-implemented method of claim 4, wherein the first predetermined lightness value is equivalent to 90% black and the second predetermined lightness value is equivalent to 30% black.

6. A computer-implemented method for generating an environmentally contextualized pattern, the method comprising:
   receiving images of an environment;
   generating a color palette of dominant colors from the images;
   removing each gray hue from the color palette to generate a modified color palette;
   setting a darkest hue of the modified color palette and a lightest hue of the modified color palette to a predetermined contrast to generate a modified darkest hue and a modified lightest hue;
   determining a split complement hue of the modified lightest hue; and
   generating the environmentally contextualized pattern, wherein the environmentally contextualized pattern comprises the split complement hue, the modified darkest hue, and the modified lightest hue, wherein the split complement hue occupies more of a surface area of the environmentally contextualized pattern than the modified darkest hue and the modified darkest hue occupies more of the surface area of the environmentally contextualized pattern than the modified lightest hue; and
   applying the environmentally contextualized pattern to at least one of the following:

an article of clothing to improve visibility of a wearer of the article of clothing within the environment; and a piece of equipment to improve visibility of the piece of equipment within the environment.

7. The computer-implemented method of claim 6, wherein generating the color palette of dominant colors from the images comprises utilizing a clustering algorithm to partition the images into a predetermined number of colors.

8. The computer-implemented method of claim 6, wherein receiving the images of the environment comprises inputting GPS data into a Google Street View Image API to receive the images.

9. The computer-implemented method of claim 8, further comprising adapting the GPS data to define a smooth path.

10. The computer-implemented method of claim 6, wherein generating the environmentally contextualized pattern comprises utilizing a reaction-diffusion algorithm.

11. The computer-implemented method of claim 10, wherein the reaction-diffusion algorithm comprises a Gray-Scott algorithm.

12. The computer-implemented method of claim 6, wherein setting the darkest hue of the modified color palette and the lightest hue of the modified color palette to a predetermined contrast comprises:

setting the darkest hue of the modified color palette to a first predetermined lightness value; and setting the lightest hue of the modified color palette to a second predetermined lightness value.

13. The computer-implemented method of claim 12, wherein the first predetermined lightness value is equivalent to 90% black and the second predetermined lightness value is equivalent to 30% black.

14. A computer system for generating an environmentally contextualized pattern from a color palette representing an environment, the computer system comprising:

a processor; and a memory coupled to the processor, the memory storing instructions that, when executed by the processor, cause the computer system to:

remove each gray hue from the color palette representing the environment to generate a modified color palette;

set a highest lightness value hue of the modified color palette and a lowest lightness value hue of the modified color palette to a predetermined contrast to generate a modified highest lightness value hue and a modified lowest lightness value hue;

determine a split complement hue of the modified lowest lightness value hue; and generate the environmentally contextualized pattern, wherein the environmentally contextualized pattern comprises the split complement hue of the modified lowest lightness value hue occupying x % of the environmentally contextualized pattern, the modified highest lightness value hue occupying y % of the environmentally contextualized pattern, and the modified lowest lightness value hue occupying z % of the environmentally contextualized pattern, wherein x>y>z; and apply the environmentally contextualized pattern to at least one of the following:

an article of clothing to improve visibility of a wearer of the article of clothing within the environment; and a piece of equipment to improve visibility of the piece of equipment within the environment.

15. The computer system of claim 14, wherein the environmentally contextualized pattern is generated via a reaction-diffusion algorithm.

16. The computer system of claim 14, wherein the highest lightness value hue of the modified color palette and the lowest lightness value hue of the modified color palette are set to the predetermined contrast via:

setting the highest lightness value hue of the modified color palette to a first predetermined lightness value; and setting the lowest lightness value hue of the modified color palette to a second predetermined lightness value.

17. The computer system of claim 16, wherein the first predetermined lightness value is equivalent to 90% black and the second predetermined lightness value is equivalent to 30% black.

* * * * *